United States Patent [19]

Coha et al.

[11] 4,208,981
[45] Jun. 24, 1980

[54] TRANSMISSION RATIO INDICATOR ASSEMBLY

[75] Inventors: Thomas F. Coha, Flint; Michael P. Klinck, Swartz Creek; Thomas Jaje, Goodrich, all of Mich.

[73] Assignee: General Motors Corporation, Detroit, Mich.

[21] Appl. No.: 19,118

[22] Filed: Mar. 9, 1979

[51] Int. Cl.² .................... G01D 5/04; G09F 9/00
[52] U.S. Cl. ................... 116/28.1; 74/10.7; 116/DIG. 20
[58] Field of Search ............. 116/28.1, DIG. 20, 307, 116/319; 74/10.9, 10.7, 10.6; 180/82

[56] References Cited

U.S. PATENT DOCUMENTS

| | | | |
|---|---|---|---|
| 3,183,884 | 5/1965 | Daniels | 116/28.1 |
| 3,406,587 | 10/1968 | Brilando et al. | 116/DIG. 20 |
| 3,739,741 | 6/1973 | Freyermuth | 116/28.1 |
| 3,805,733 | 4/1974 | Gilbert | 116/28.1 |
| 3,830,192 | 8/1974 | Ronewicz et al. | 116/28.1 |
| 3,897,747 | 8/1975 | Biazzo | 116/28.1 X |
| 3,990,387 | 11/1976 | Martin | 116/28.1 |

Primary Examiner—Daniel M. Yasich
Attorney, Agent, or Firm—Donald F. Scherer

[57] ABSTRACT

A transmission ratio indicator assembly has a linear input member and an output member that moves on a constant radius. The input member includes a slide member guided on a flat surface, which slide member has an arm extending normal to the flat surface and into a slot formed in a follower portion of the output member. The follower portion is guided in a constant radius recess and has secured thereto an indicator which aligns with the transmission ratio selections imprinted on an indicia surface disposed on the outer wall of the constant radius recess in response to movement of the input member.

3 Claims, 4 Drawing Figures

TRANSMISSION RATIO INDICATOR ASSEMBLY

This invention relates to indicator mechanisms and more particularly to automatic transmission ratio indicator assemblies.

It is an object of this invention to provide an improved transmission ratio indicator assembly wherein a linear operator input motion is translated to a constant radius output motion through an arm and slot drive arrangement.

It is another object of this invention to provide an improved transmission ratio indicator assembly wherein a slide member is guided on a flat base for linear movement and has an arm portion drivingly connected in an elongated slot formed in a follower member which is guided for constant radius motion in a recess whereby an indicator attached to the follower member is selectively aligned with transmission ratio indicia imprinted on the outer wall of the recess.

These and other objects and advantages of the present invention will be more apparent from the following description and drawings in which.

Figure 1:
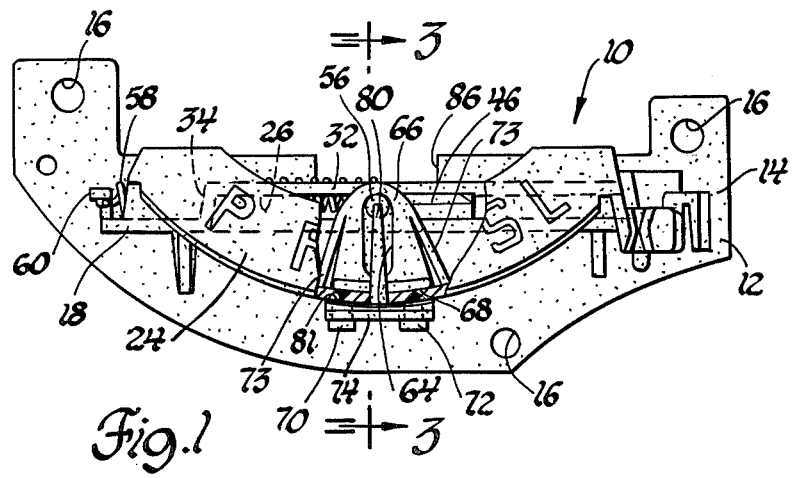
FIG. 1 is a front elevational view of a transmission ratio indicator assembly.

Referring now to the drawings, wherein like characters represent the same or corresponding parts throughout the several views, there is seen an indicator assembly generally designated 10, which is comprised of a unitary base structure 12 having a substantially vertical mounting surface 14 through which a plurality of holes 16 are formed to permit attachment of the base 12 in the instrument panel of an automotive vehicle. Extending substantially horizontally from the mounting surface 14 is a flat portion 18 which is also connected to a vertical wall 20 of a constant radius recess 22 formed between the wall 20 and another vertical wall 24. The flat surface 18 has formed therein a guide opening 26 and the recess 22 has a constant radius bottom surface 28 in which is formed a guide slot 30.

The guide opening 26 has vertically displaced therefrom a guide portion 32 which has one end wall 34 integrally formed between the guide 32 and flat surface 18. The other end of guide 32 is formed integrally with an irregularly shaped vertical wall 36 in which is formed a cable guide opening 38. A second cable guide opening 40, which is generally cylindrical in shape, is formed integrally with the base 12 and includes a substantially vertical through aperture 42 which is communicated with the outer surface of cable guide 40 through a vertical slot 44.

A slide member 46 has a guide recess 48 formed on the upper surface thereof. The recess 48 is aligned with the guide portion 32. A guiding protuberance 50 formed on the lower surface of slide member 26 is aligned in the guide opening 26. There is also formed on the slide member 46 a pair of upstanding attachment posts 52 and 54 and a substantially horizontally extending arm 56. The guide post 52 has connected thereto one end of a tension type coil spring 58 the other end of which is connected to an attaching post 60 formed integrally with the base 12. The guide post 54 has attached thereto a cable 62 which is routed through cable guide opening 38 and aperture 42. The cable 62 is preferably then connected to a conventional transmission ratio selector assembly in the vehicle steering column as shown in U.S. Pat. Nos. 3,800,737 or 3,897,747.

Figures 3, 4:
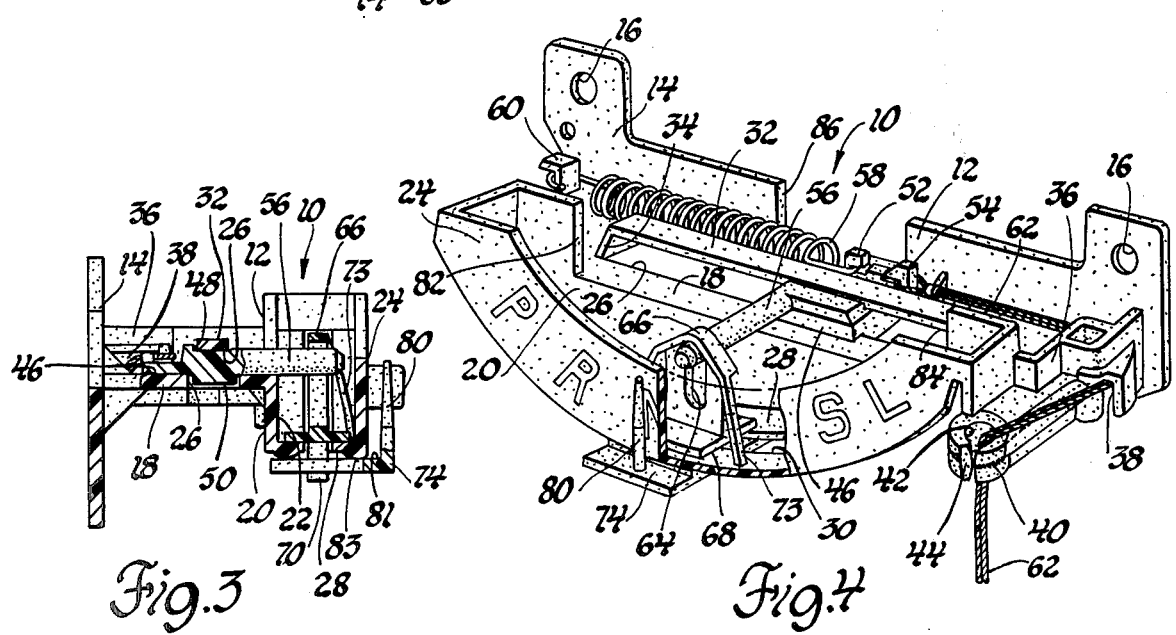
FIG. 3 is a sectional view taken along line 3—3 of FIG. 1.
FIG. 4 is a perspective view of the indicator assembly.

The arm 56 rests on the flat surface 18 and extends into an elongated slot 64 formed in a follower member 66. The follower member 66 has a curved bottom surface 68 which rests on the curved surface 28 of recess 22 and the bottom surface 68 also has a pair of attaching posts 70 and 72 which extend through the guide slot 30. A pair of spring arms 73 extend from the follower member 66 and abut the inner surface of the wall 24 of recess 22. The spring arms 73 maintain the attaching posts 70 and 72 in contact with the left edge, as viewed in FIG. 3, of guide slot 30. This prevents the follower member 66 from vibrating relative to the base structure 12 thus eliminating a noise source that could be irritable to the operator.

An indicator member 74 has two bifurcated arms 76 and 78 which are attached to the posts 72 and 70, respectively. A pointer 80 is formed integrally with the indicator 74 and extends substantially parallel to the outer surface of wall 24 of recess 22. The outer surface of wall 24 has imprinted or otherwise disposed thereon, a plurality of transmission indicia such as "P" for Park, "R" for Reverse, "N" for Neutral, "D", not shown, for Drive, "S" and "L" for Intermediate and Low, respectively. The spring arms 73, while maintaining the posts 70 and 72 in contact with the edge of the slot 30, also maintain the upper surface 81 of indicator member 74 in contact with a guide rib 83 formed on the outer bottom surface of recess 22.

Figure 2:
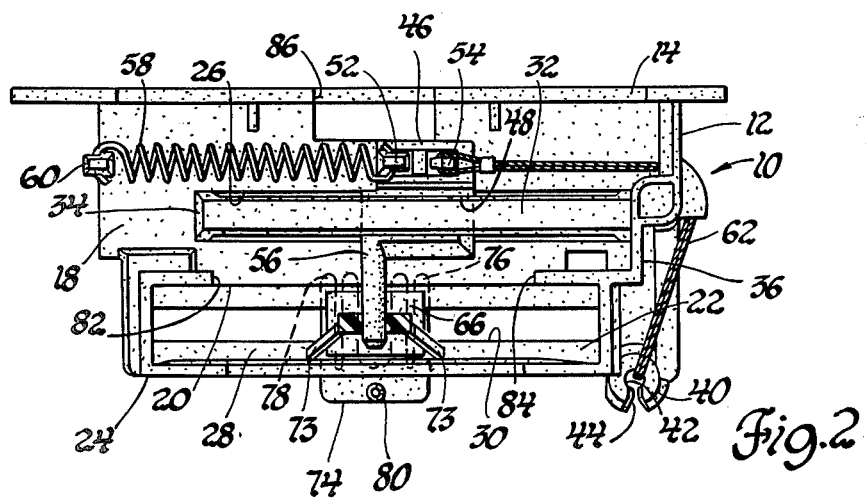
FIG. 2 is a top view of the transmission ratio indicator assembly.

The spring 58 urges the slide member 46 to the left, as viewed in FIGS. 1 and 2, and due to the arm and slot drive arrangement, the follower member 66 and indicator 74 are urged in the same direction. The follower 66, however, must follow the constant radius curved path of recess 22. The linear to circular motion translation is permitted by the arm and slot drive arrangement. Movement of the slide member 46 to the left is limited by the arm 56 abutting a stop portion 82 formed by the intersection of flat surface 18 and wall 20 while rightward movement of the slide member 46 is limited by the arm 56 contacting a stop surface 84 also formed by the intersection of flat surface 18 and wall 20. These stop surfaces 82 and 84 limit the linear travel of slide member 46 and therefore also limit the arcuate travel of follower member 66. The steering column mounted shift assembly can also be utilized to limit the extent of travel, and also provide detented positions intermediate the stop surfaces in a well known manner.

When the vehicle operator places or desires to place the transmission in the "Park" mode, he moves the shift lever which relieves the load on cable 62 thus permitting the spring 58 to return the slide member 46 and therefore follower 66 to the far left position where the pointer 80 is aligned with "P" on the outer surface of wall 24. Through the use of the well known detent mechanisms, the operator can select the various drive ratios, and upon selection thereof, the pointer 80 will be aligned with the ratio selected due to controlled movement of the slide member 46 by the cable 62. The constant radius travelled by the indicator member 74 gives the appearance that the pointer 80 is continually directed toward the center of the radius. This provides some aesthetic value to the instrument panel and permits the indicator assembly to be placed on the periphery of a substantially circular speedometer cluster.

The unitary or one-piece base 12 reduces the number of parts necessary to be handled at assembly. The indicator assembly 10 is quite easily assembled. Assuming the spring 58 is not connected to the slide member 46, the slide member 46 can be inserted into the position shown through an opening 86 formed in the mounting surface 14 which is substantially centrally located therein and the guide 32 has sufficient resiliency to move vertically at the center thereof to permit the easy insertion of the slide member 46. The follower member 66 and indicator 74 are preassembled in the recess 22 such that at assembly, the arm 56 will engage in the slot 64. Then the spring 58 can be attached to posts 60 and 52 after which the cable 62 is routed through opening 38 and opening 42 and connected to post 54. The vertical slot 44 assists in permitting the cable 62 to be inserted in the opening 42 at assembly. Thus, as above described, it is seen that the indicator assembly permits easy assembly.

The embodiments of the invention in which an exclusive property or privilege is claimed are defined as follows:

1. A transmission ratio indicator assembly for use in a vehicle to indicate the transmission ratio manually selected by the operator, the assembly comprising; a base having a substantially flat surface, a guide portion spaced from and parallel to the flat surface, a guide opening in the flat surface aligned with the guide portion, a constant radius recess having parallel walls disposed perpendicular to the flat surface, an indicia surface on the outwardly facing surface of one of the parallel walls having transmission ratio indicia imprinted thereon; a slide member slidably disposed on said flat surface and having guide recess means cooperating with said guide portion and guide protuberance means cooperating with said guide opening, and said slide member also having an arm extending into said constant radius recess; manually operable means for moving said slide member on said flat surface; follower means guidably disposed in said constant radius recess and having elongated slot means engaged by said arm to move said follower means along a constant radius path while said arm moves in a linear path; and indicator means secured to said follower means and including a pointer which is moved in unison with the follower means along an arcuate path and the pointer is disposed parallel with and adjacent to said indicia surface to indicate the transmission ratio selected and said pointer is continually pointed radially inward toward the center of said constant radius recess in alignment with the indicia indicating the transmission ratio selected.

2. A transmission ratio indicator assembly for use in a vehicle to indicate the transmission ratio manually selected by the operator, the assembly comprising; a base having a substantially flat surface, a guide portion spaced from and parallel to the flat surface, a guide opening in the flat surface aligned with the guide portion, a constant radius recess having parallel walls disposed perpendicular to the flat surface, an indicia surface on the outwardly facing surface of one of the parallel walls having transmission ratio indicia imprinted thereon; a slide member slidably disposed on said flat surface and having guide recess means cooperating with said guide portion and guide protuberance means cooperating with said guide opening, and said slide member also having an arm extending into said constant radius recess; a tension spring means for urging said slide member in one direction; a manually movable cable means for moving said slide member in the other direction on said flat surface; follower means guidably disposed in said constant radius recess and having elongated slot means engaged by said arm to move said follower means along a constant radius path while said arm moves in a linear path; and indicator means secured to said follower means and including a pointer which is moved in unison with the follower means along an arcuate path and the pointer is disposed parallel with and adjacent to said indicia surface to indicate the transmission ratio selected and said pointer is continually pointed radially inward toward the center of said constant radius recess in alignment with the indicia indicating the transmission ratio selected.

3. A transmission ratio indicator assembly for use in a vehicle to indicate the transmission ratio manually selected by the operator, the assembly comprising; a base having a substantially flat surface, a guide portion spaced from and parallel to the flat surface, a guide opening in the flat surface aligned with the guide portion, a constant radius recess having parallel walls disposed perpendicular to the flat surface and a guide slot formed in the recess between the parallel walls, an indicia surface on the outwardly facing surface of one of the parallel walls having transmission ratio indicia imprinted thereon; a slide member slidably disposed on said flat surface and having guide recess means cooperating with said guide portion and guide protuberance means cooperating with said guide opening, and said slide member also having an arm extending into said constant radius recess; manually movable cable means and spring means for moving said slide member on said flat surface; follower means having a pair of guide posts extending through said guide slot of said constant radius recess, said follower means having elongated slot means engaged by said arm to move said follower means along a constant radius path while said arm moves in a linear path; and indicator means secured to said guide posts on said follower means and said indicator means including a pointer which is moved in unison with the follower means along an arcuate path and the pointer is disposed parallel with and adjacent to said indicia surface to indicate the transmission ratio selected and said pointer is continually pointed radially inward toward the center of said constant radius recess in alignment with the indicia indicating the transmission ratio selected.

* * * * *